United States Patent [19]
Tilmans

[11] Patent Number: 5,165,289
[45] Date of Patent: Nov. 24, 1992

[54] RESONANT MECHANICAL SENSOR

[75] Inventor: Hendrikus A. C. Tilmans, Enschede, Netherlands

[73] Assignee: Johnson Service Company, Milwaukee, Wis.

[21] Appl. No.: 551,523

[22] Filed: Jul. 10, 1990

[51] Int. Cl.⁵ ............................................. G01L 1/10
[52] U.S. Cl. ................................... 73/862.59; 73/702; 73/517 AV
[58] Field of Search ............... 73/702, 704, 517 AV, 73/862.59, DIG. 1

[56] References Cited

U.S. PATENT DOCUMENTS

| | | |
|---|---|---|
| 4,674,180 | 6/1987 | Zavracky et al. |
| 4,764,244 | 8/1988 | Chitty et al. |
| 5,009,108 | 4/1991 | Harada et al. ............... 73/704 |

FOREIGN PATENT DOCUMENTS

| | | | |
|---|---|---|---|
| 0127931 | 5/1989 | Japan ............... | 73/702 |
| WO8010567 | 11/1989 | PCT Int'l Appl. ......... | 73/517 AV |
| 1596982 | 9/1981 | United Kingdom. | |
| 2180691 A | 4/1987 | United Kingdom. | |

OTHER PUBLICATIONS

Thornton et al., "Novel Optically Excited Resonant Pressure Sensor", Electron Lett., vol. 24, No. 10 (1988), pp. 573-574.
Smits et al., "Pressure Dependence of Resonant Diaphragm Pressure Sensor, Third International Conference on Solid-State Sensors and Actuators", 1985, pp. 93-96.
J. C. Greenwood, "Etched Silicon Vibrating Sensor", J. Physics E. Sci. Instrs., vol. 17, No. 8 (1984), pp. 650-652.
Ikeda et al., "Three-Dimensional Micromachinery of Silicon Resonant Strain Gauge", Technical Digest of the 7th Sensor Symposium (1988), pp. 193-196.
T. S. J. Lammerink et al., "Integrated Thermally Excited Resonant Diaphragm Pressure Sensor", Proceedings of the Third International Conference on Solid-State Sensors and Actuators, Transducers '85 (1985), pp. 97-100.
Ikeda et al., "Silicon Pressure Sensor with Resonant Strain Gauges Built Into Diaphragm", Tech. Digest of the 7th Sensor Symposium (1988), pp. 55-58.
D. Uttamchandani et al. "Optically Excited Resonant Beam Pressure Sensor", Elect. Letters, vol. 23, No. 25 (1987), pp. 1333-1334.
Guckel et al., The Application of Fine Grained, Tensile Polysilicon to Mechanically Resonant Transducers, B12.2, Transducers '89 (1989), p. 143.

Primary Examiner—Reinhard J. Eisenzopf
Assistant Examiner—E. Shopbell
Attorney, Agent, or Firm—Foley & Lardner

[57] ABSTRACT

The sensor according to the present invention provides a device for measuring the magnitude of an applied load as a shift in resonant frequency of a mechanical resonator caused by load-induced strains on the resonator. The sensor includes a substrate, generally constructed of a semiconductor material, e.g. silicon, a diaphragm substantially supported along its outer periphery by the substrate, a boss abutting a region of the diaphragm remote from the outer periphery of the diaphragm, at least one resonator in the form of a beam having one end integral to the diaphragm proximate the region of the boss and the other end integral to the diaphragm remote from the boss, a hermetic seal for enclosing the resonator, and an exciter/detector for measuring changes in the natural frequency of the resonator due to an applied load. Preferably, the sensor includes a differential resonator configuration in which the resonators are positioned rectilinearly with respect to each other and are covered by the same hermetic seal.

15 Claims, 13 Drawing Sheets

RESONANT MECHANICAL SENSOR

TECHNICAL FIELD

This invention relates generally to resonant mechanical sensors for measuring mechanical loads, in particular, to semiconductor diaphragm sensors with built-in resonators.

BACKGROUND OF THE INVENTION

Microminiature resonant sensors fabricated in semiconductor materials have gained increased use in the precision pressure measurement field. These sensors have high stability, high sensitivity and low temperature coefficients. Their stability and accuracy are less dependent on electronic signal processing circuitry than are comparable piezoresistive sensors and capacitive sensors. Their construction, however, is generally more complex than piezoresistive pressure sensors.

Resonant sensors utilize a vibrating micromechanical body or resonator and provide a frequency as output data. The frequency output depends upon a stress modifying the natural resonant vibrational frequency of the resonator. The behavior of a resonator, for example, a vibrating beam, is somewhat analogous to that of a stretched string. An increase in tension in the string causes an increase in the resonant frequency. In a resonant sensor, a load applied to the structure results in a strain in the resonator causing a shift of the resonator's resonant frequency. The frequency output of the resonator provides a measure of the magnitude of the mechanical load applied to the sensor structure. Physical parameters such as an acceleration, pressure, force, and temperature can be measured as a consequence of the frequency shift. Analog and/or digital electronics interface with the varying frequency output, with high resolution achievable.

Sensors and gauges are often ascribed gauge factors. The gauge factor of a resonant strain gauge or resonator is basically the rate of change of frequency per unit strain and is a measure of the sensitivity of the gauge. Gauge factors of resonant strain gauges are typically orders of magnitude higher than gauge factors for piezoresistive strain gauges, e.g., 3,000 compared to 30. Resonant sensors are thus very attractive for measuring small mechanical loads with a high resolution. Unlike piezoresistive gauges, the gauge factor of resonant gauges is not dependent on the impurity concentrations of the materials of the gauge, but rather dependent on resonator dimensions. For a beam resonator, the gauge factor depends on the aspect ratio, L/h, where L is the length of the beam and h is the thickness of the beam, and on the residual strain.

Microminiature resonant sensors are generally fabricated in semiconductor materials, primarily silicon-based materials, using standard processes which have been developed in the semiconductor art such as thin film deposition, etching, doping and lithography. These processes permit the formation of very small, complex three-dimensional structures. Such structures can be made reproducibly and in large numbers.

Several structures for the miniature silicon resonators have been described, including resonant diaphragms, cantilevers, and beams of various shapes. The latter are typically suspended over a silicon diaphragm of uniform thickness. Because the resonator is coupled to a diaphragm, displacements of the diaphragm due to an applied load distort the resonator, modifying the resonant frequency of the resonator. See, e.g., K. Ikeda et al., British Patent Application GB 2180691A; S. C. Greenwood, British Patent 1,596,982; Thornton et al., "Novel Optically Excited Resonant Pressure Sensor, *Electron Lett.*, Vol. 24 (1988), pp. 573-574; Smits et al., "Pressure Dependence of Resonant Diaphragm Pressure Sensor," *Third International Conference on Solid-State Sensors and Actuators* (1985), pp. 93-96; J. C. Greenwood, "Etched Silicon Vibrating Sensor", *J. Physics E. Sci. Instrs.*, Vol. 17 (1984), pp. 650-652.

Various placements for resonant beams with respect to a diaphragm have been described. Typically, the resonator is located at the center of the diaphragm. See, e.g., Greenwood, *J. Physics E. Sci. Instrs.*, Vol. 17 (1984) pp. 650-652. But Ikeda et al., "Three-Dimensional Micromachinery of Silicon Resonant Strain Gauge," *Technical Digest of the 7th Sensor Symposium* (1988), pp. 193-196, describe a sensor with one resonator at the center and another at the edge of the diaphragm.

In some sensors the resonator is hermetically sealed in an evacuated cap or enclosure (see, Ikeda, *Technical Digest of the 7th Sensor Symposium* (1988) pp. 55-58). The resonator in this architecture is separated from its surroundings, eliminating effects such as the dependency of frequency on the specific mass of the surrounding medium. The air damping of the resonator will also be reduced resulting in a high quality factor. A quality factor is a measure of the energy loss of a resonator. Quality factors are always finite, i.e., energy must be supplied to the resonator or it will stop vibrating. High quality factors allow the fabrication of high resolution devices, i.e., small changes in the load can be detected by measuring the (small) shifts in the frequency.

A sealing cap, however, may become an important design parameter of the mechanical structure of the sensor. Since the cap must endure the same base pressure as the sensor, e.g., one atmosphere, it must have a certain minimum thickness to avoid collapse. If the thickness of the cap is similar to the thickness of the diaphragm, the cap partly determines the stress distributed in the diaphragm. For a uniform diaphragm sensor, the cap will, for example, cause the neutral plane of the diaphragm to rise, i.e., come closer to the resonator. As a result, this will reduce the induced bending stresses, thus lowering sensitivity. Furthermore, the cap strongly impacts the position of the inflection points of the diaphragm, i.e., points of zero bending stresses. The position of these inflection points is not very predictable, which further complicates placement of the resonators.

For operation, the resonators require excitation into vibrational motion and detection of this motion. An exciter exerts forces and moments on the resonator which bend and elongate or contract the resonator. If the frequency of excitation is the same as the mechanical resonant frequency, the resonator vibrates with a large amplitude. The detector picks up the vibratory motion and its output signal will show a resonance peak. Excitation and detection elements must thus be included in the sensor structure. Excitation methods include thermal, optical, electrostatic, piezoelectric and magnetic. Detection methods include piezoelectric, piezoresistive, capacitive and optical. Examples of excitation/detection pairs described in the prior art include: thermal excitation/piezoresistive detection; electrostatic excitation/capacitive detection; Lorentz force excitation/magnetic flux detection; piezoelectric excitation/piezoelectric detection, e.g., using ZnO; and optical excitation/optical detection.

Thermal excitation and piezoresistive detection are very attractive from a technological point of view. See, for example, T. S. J. Lammerink et al., "Integrated Thermally Excited Resonant Diaphragm Pressure Sensor", *Proceedings of the Third International Conference on Solid-State Sensors and Actuators*, Transducers '85 (1985), pp. 97-100. Fabrication is relatively easy. However, heat dissipation is an inherent problem. Dissipated heat will cause thermally induced stresses in a sensor which will affect the resonant frequency. Highly accurate devices impose stringent requirements on the control of the heat dissipation and heat flow.

The technology for fabricating the elements required in electrostatic excitation/capacitive detection is also relatively simple. Capacitive detection, however, is known to be a very insensitive method. This detection method generally requires on-chip circuitry which complicates the sensor fabrication process. Also, suppression of parasitic capacitances requires special attention.

The Lorentz force excitation/magnetic flux detection method, in which heat dissipation is also an inherent problem, requires a permanent magnet proximate to the resonator. See, for example, Ikeda et al., "Silicon Pressure Sensor With Resonant Strain Gauges Built Into Diaphragm," *Tech. Digest of the 7th Sensor Symposium* (1988), pp. 55-58. Thus, packaging of a sensor using this technology is more complicated than other methods.

Optical excitation and detection is difficult to implement if the resonator is housed in a cap. See, for example, D. Uttamchandani et al., "Optically Excited Resonant Beam Pressure Sensor", *Elect. Letters*, Vol. 23 (1987), pp. 1333-1334 and Thornton et al., "Novel Optically Excited Resonant Pressure Sensor," *Elect. Letters*, Vol. 24 (1988), pp. 573-574. The cap material must be transparent to the light used for excitation. Also, optical detection requires a complicated optical interferometer set up.

The use of piezoelectric thin films, in particular, zinc oxide films, offers a very efficient way for both excitation and detection of the motion. The sensor fabrication process, however, is complicated because zinc oxide is not a very integrated circuit-compatible material. Additionally, the residual stress of the film must be controlled.

Despite attempts to provide accurate, simple microminiature resonant sensors, prior art devices suffer, among other things, from use of bulky excitation/detection methods which result in awkward packaging, and nonlinearity between frequency output and applied force due to temperature effects, placement of resonators and use of hermetic sealing caps. The present invention provides a resonant sensor in which parameters involving material properties of the resonators, temperature effects, and long term drift are essentially not present in the final output frequency signal. The sensor provides a resonator built in or integral to the diaphragm, allows for very accurate control over diaphragm thickness, exhibits symmetric strain under front and back pressures, and virtually eliminates the resonator sealing cap being a determinant of mechanical behavior of the diaphragm.

SUMMARY OF THE INVENTION

The sensor according to the present invention provides a device for measuring the magnitude of an applied load as a shift in resonant frequency of a mechanical resonator caused by load-induced strains on the resonator. The resonator operates in a flexural bending mode. The sensor includes a substrate, generally constructed of a semiconductor material, e.g., silicon, a diaphragm substantially supported along its outer periphery by the substrate, a boss abutting a region of the diaphragm remote from the outer periphery of the diaphragm, at least one resonator in the form of a beam having one end integral to the diaphragm proximate the region of the boss and the other end integral to the diaphragm remote from the boss, a hermetic seal for enclosing the resonator, and an exciter/detector for measuring changes in the natural frequency of the resonator due to an applied load. The diaphragm is suitably a thin, deformable membrane, generally constructed of materials which can be deposited as thin films. Preferably, the sensor includes a differential resonator configuration in which the resonators are positioned rectilinearly with respect to each other and covered by the same hermetic seal or cap. The resonators are built-in, that is, are integral to the diaphragm. In the differential resonator configuration, one resonator has an end proximate the substrate and the other resonator has an end proximate the boss.

Excitation and detection of the resonator may be suitably provided by vibration excitation-detection pairs which may include a thermal exciter-piezoresistive detector pair, and may preferably include a piezoelectric exciter-detector in which a piezoelectric material is sandwiched between two electrodes. The piezoelectric material may be suitably made of a material with a high piezoelectric coefficient and capable of being deposited as a thin film, for example, zinc oxide.

The sensor structure of the present invention advantageously provides a differential frequency signal which is proportional to the applied load, essentially eliminating temperature effects and long-term drift effects. The bossed structure brings regions of opposite strain close together, allowing the resonators to be sealed under the same cap. The position of inflection points, important to the positioning of the resonators, is independent of the cap. The bossed structure also allows for easily-implemented over-pressure protection, reducing the risk of structure rupture due to loads that exceeded the tensile strength of the materials.

Although the boss makes the structure stiffer than a nonbossed diaphragm, resulting in a lower absolute sensitivity (i.e., the rate of change of frequency with load), full-scale sensitivity (i.e., the total change in frequency with load) of the bossed sensor is higher than a nonbossed structure. This is especially true for high aspect ratio (width/thickness) diaphragms where nonlinear behavior becomes significant even for low pressures (500 Pa) or forces, resulting in a decreased full scale sensitivity.

Housing of the two resonators within the same evacuated cap also advantageously eliminates differences in ambient conditions such as temperature gradients. Additionally, because the cap is attached to the boss on one end and to the substrate on the other end, this configuration causes the influence of the cap on the location of the neutral bending moment plane to be eliminated, i.e., the neutral plane will always lie halfway the thickness of the diaphragm. The cap only adds increased stiffness.

Generally, the fabrication of the sensor according to the present invention includes forming a diaphragm with a boss and built-in resonator(s) on a first surface of a substrate, providing a exciter and detector on the resonator, and providing a cap on the surface of the diaphragm forming a cavity enclosing the resonator(s). The diaphragm may have a substantially laminar construction, formed of successive layers of thin films, for example, polysilicon, stacked on a silicon substrate with locally oxidized regions of silicon dioxide. The cap is formed by depositing, for example, a polysilicon layer over a solid glass cap covering the resonator. The required geometry of the sensor is achieved by two-stage etching—first, an anisotropic etch from the backside of the substrate, and then, a sacrificial layer etch of the silicon dioxide and glass regions to define the diaphragm and form the resonator and cavity. The exciter and detector elements may be formed by implantation or thin film deposition. The laminar construction of the diaphragms allows for very accurate control of diaphragm thickness.

According to another aspect of the present invention, two methods of fabrication using different excitation-detection pairs are described. The first method utilizes a thermal-piezoresistive excitation/detection pair. The second utilizes a piezoelectric excitation/detection pair.

BRIEF DESCRIPTION OF THE DRAWING

The preferred exemplary embodiment of the present invention will hereinafter be described in conjunction with the appended drawing wherein like designations refer to like element throughout and in which.

DETAILED DESCRIPTION OF PREFERRED EXEMPLARY EMBODIMENTS

This invention relates to a mechanical resonator whose natural frequency of vibration or oscillation is changed by variations in an external mechanical load. The mechanical resonator is suitably a beam with both ends clamped. An axial load to the resonator causes the resonant frequency of the resonator to change. A tensile load results in an increase of the frequency, while a compressive load results in a decrease of its frequency.

The fundamental resonant frequency of a (wide) beam with a rectangular cross-section as a function of axial strain can be approximated as:

$$f \approx 1.03 \left[ \frac{E}{\rho(1-\nu^2)} \right]^{\frac{1}{2}} \left( \frac{h}{L^2} \right) \left[ 1 + 0.286 \epsilon (1-\nu^2) \left( \frac{L}{h} \right)^2 \right]^{\frac{1}{2}}$$

where
f is the natural resonant frequency for fundamental vibrational mode
E is Youngs' modulus
$\rho$ is specific mass
$\nu$ is Poisson's ratio
h is thickness of the beam
L is beam length
$\epsilon$ is axial strain The sensor according to the present invention includes a bossed diaphragm supported on a substrate, with at least one, preferably two, built-in resonators housed in the same evacuated cap. The sensor may be fabricated starting with a single-crystal silicon wafer using processing steps such as photolithography, thin film deposition, selective doping, selective and anisotropic chemical etching. The sensor of the present invention is characterized by several attributes: high sensitivity, elimination of effects of surrounding medium on the resonator, symmetry of behavior for measurement of front and back loads, partial elimination of first order temperature effects and long term drift effects, and substantially linear behavior even at low loads.

As used herein, the terms "resonator", "resonant strain gauge", "resonant beam", and "resonating beam" are meant to describe a beam or beam-like structure clamped at both ends in which application of an axial load will cause a shift in the natural resonant frequency of the beam. The term "resonant sensor" refers to a sensor with a frequency shift output in which a resonator or resonators are part of the entire sensor structure to which the load is applied. The terms "shell" or "cap" are meant to describe an evacuated, hermetic, protective enclosure for the resonator(s). The term "diaphragm" describes a thin deformable membrane, typically constructed of a semiconductor material. The term "substrate" is meant to describe the underlayer, bottom or foundation upon which a diaphragm is supported. The term "front" or "front side" describes the surface of a diaphragm (or substrate) on which the resonator is formed. The term "back" or "backside" refers to the surface opposite the resonator.

Figure 1:
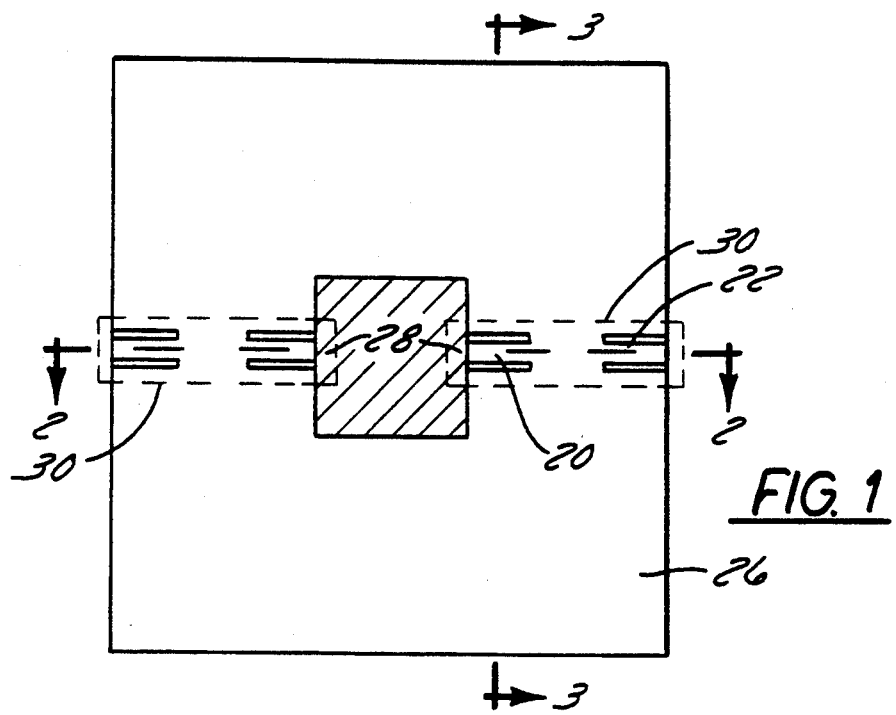
FIG. 1 is a top plan schematic view of a diaphragm with built-in resonators according to the present invention.
Figure 2:
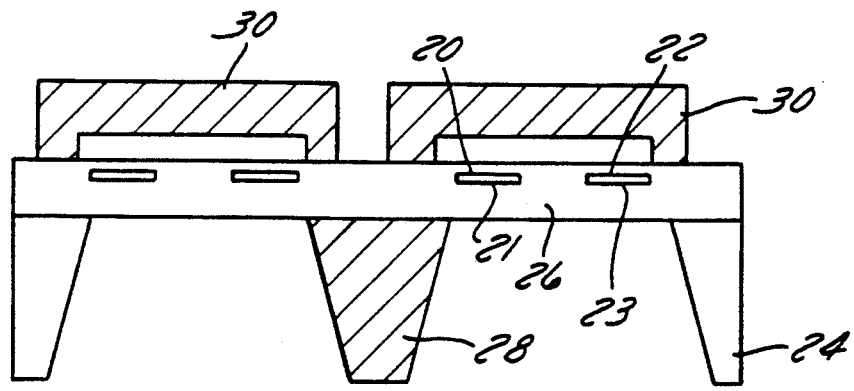
FIG. 2 is a cross-sectional view along line 2—2 in FIG. 1.
Figure 3:
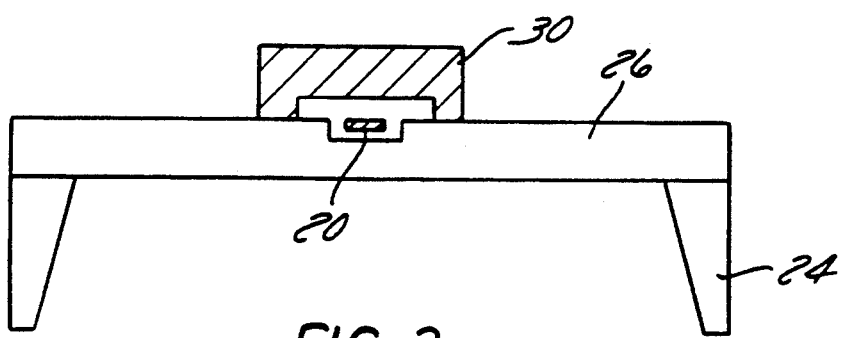
FIG. 3 is a cross-sectional view along line 3—3 in FIG. 1.

Reference is initially made to the plan view of FIG. 1 and sectional views of FIGS. 2 and 3 in which a rectangularly shaped diaphragm 26 supported on a substrate 24, a boss 28 and resonant beams 20 and 22 defined by cavities or gaps 21 and 23, respectively, are depicted. Hermetic cap 30 (illustrated in phantom in FIG. 1) is shown enclosing and sealing beams 20 and 22. FIG. 1 illustrates two sets of beams on either side of the boss 28. For operation of the sensor, only one set is necessary, but other sets may be provided for redundancy, i.e., if one set fails, operation may be switched to another set.

Figure 4:
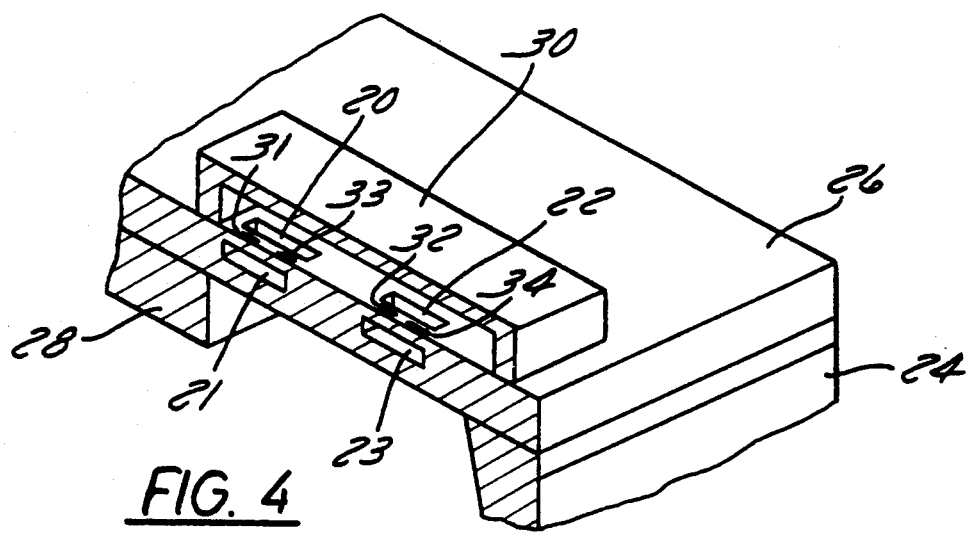
FIG. 4 is an enlarged perspective section illustrating the excitation/detection elements of a resonator according to the present invention.

In the perspective view of FIG. 4, diaphragm 26 is illustrated as being suitably supported about its outer periphery, i.e., framed, by the edge of substrate 24 so as to provide diaphragm 26 with a maximum unsupported area in which to flex or deform. A portion of the bottom surface of diaphragm 26 is reinforced or stiffened by boss 28, preferably positioned substantially in the center of diaphragm 26. As discussed below, the use of paired resonators provides certain measuring advantages not enjoyed by single resonators.

Referring again to FIGS. 1 and 4, it should be noted that the resonators are integral with diaphragm 26. Resonator beam 20 has one end integral to a region of diaphragm 26 supported by boss 28. Resonant beam 22, on the other hand, has one end integral to a region of diaphragm 26 supported by substrate 24. Cap 30 has one end anchored to the region of diaphragm 26 supported by boss 28 and the other end is anchored to a region of diaphragm 26 supported by substrate 24.

Resonant beam 20 is positioned lengthwise between the region of the diaphragm supported by the boss and the region supported by the substrate with one end of beam 20 proximate the region of the diaphragm 26 supported by the boss 28. Resonant beam 22 is also positioned lengthwise between the boss region of diaphragm 26 with one end proximate the region of diaphragm 26 supported by substrate 24. Beams 20 and 22 housed together under cap 30 are rectilinearly disposed with respect to each other.

To provide detection of the strain induced in resonators 20 and 22 from applying an external load to the sensor structure, resonant beams 20 and 22 are provided with a plurality of excitation/detection elements 32 and 34, such as, for example, thermal exciters and piezoresistive detectors, or piezoelectric exciters and detectors. The exciters are mechanical drivers setting the resonant beams in a vibrating motion and the detectors measure a change in that motion responsive to deformation of the diaphragm.

While the planar dimensions of diaphragm 26 are shown as generally rectangular, diaphragm 26 may suitably be circular. The dimensions of the diaphragm and boss are mainly determined by the particular application in which the sensor is to be used. For example, for measuring low pressures, high aspect ratio (width/thickness) diaphragms are required. The shape and dimensions of the diaphragm are independent of the initial thickness of the substrate starting material. Generally, dimensions of a square diaphragm may suitably range from about 900 μm×900 μm×1.5 μm to about 2000 μm×2000 μm×4 μm, typically about 1,200 μm×1,200 μm ×2 μm. The planar shape of boss 28 is shown as generally square but, boss 28 may suitably be any shape, such as circular. Typical dimensions of a square boss are about 600 μm×600 μm×300 μm. Dimensions of a resonant beam may be in the range from about 100 μm×40 μm×0.5 μm to about 500 μm×50 μm×2 μm, typically 100 μm in length, 40 μm in width and 0.5 μm in thickness. It is noted that the dimensions of the beam, in part, determine its resonant frequency, which should preferably be below 1 MHz to avoid complication with interfacing electronics, as low frequency circuits are easier to design than high frequency ones. Cap 30 may be suitably formed of any shape as long as cap 30 hermetically seals both resonators 20 and 22 from the surrounding environment and is anchored at the boss and substrate regions of the diaphragm. Cap thickness is typically about 2 to 3 μm, capable of withstanding a pressure up to 0.2 MPa (2 atm).

Diaphragm 26 may be suitably constructed of a material that can be deposited as a thin film, for example, polycrystalline silicon (or polysilicon) or silicon nitride. Substrate 24 is suitably a single-crystal semiconductor material such as a silicon wafer. Excitation/detection elements 32 and 34 may be any of the elements previously described and known in the art, preferably elements providing thermal excitation and piezoresistive detection, more preferably elements providing piezoelectric excitation and detection, and most preferably, a thin film of piezoelectric material, such as zinc oxide, as both piezoelectric exciter and detector.

Figure 5:
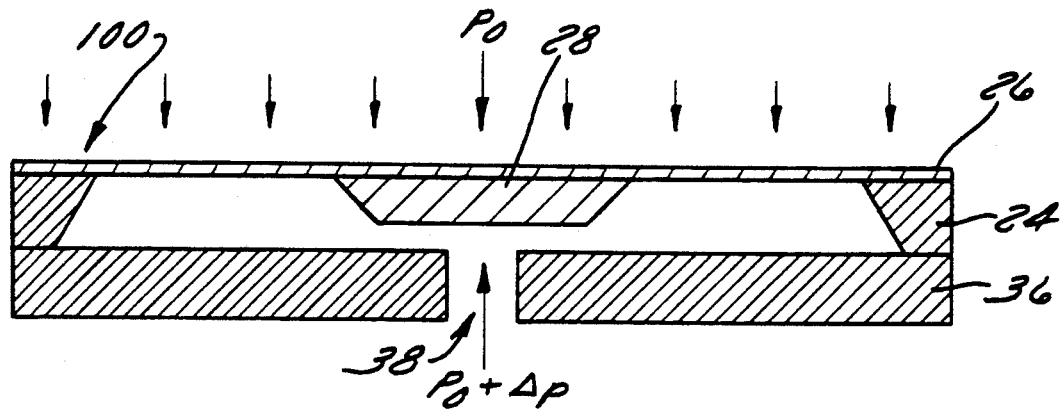
FIG. 5 is a schematic diagram illustrating a cross-section of the sensor according to the present invention used as a differential pressure (or acceleration) sensor.
Figure 6:
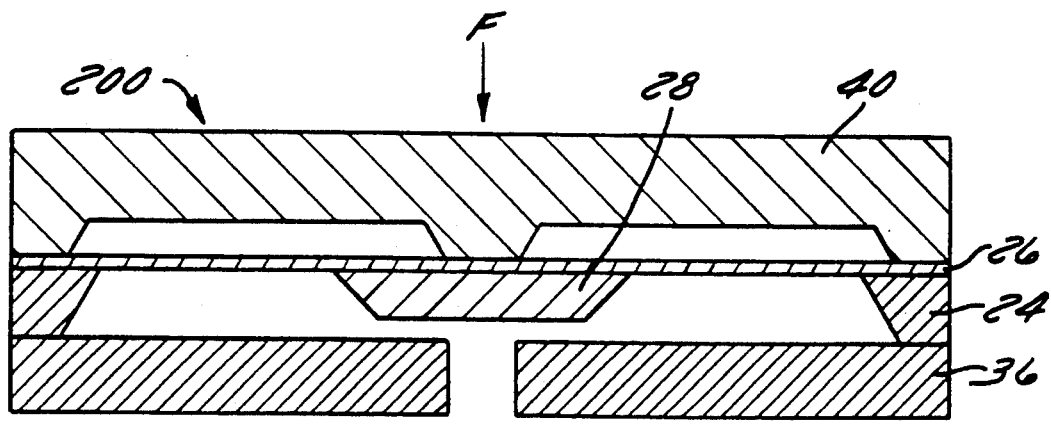
FIG. 6 is a schematic diagram illustrating a cross-section of the sensor according to the present invention used as a force sensor.

Sensor 10 may be constructed as a pressure sensor (either absolute or differential), a force sensor or an acceleration sensor. The architecture for a differential pressure sensor 100 and a force sensor 200 are schematically shown in FIGS. 5 and 6, respectively. Referring to FIG. 5, a differential pressure sensor 100 is depicted. The arrows designated $P_O$ represent the base ambient pressure. The arrow, designated $P_O + \Delta p$, is the applied pressure which is the base pressure plus a change in pressure, i.e., a differential pressure. Pressure may be applied directly to the boss 28 and the diaphragm 26. The sensor 100 is shown attached to support 36 which functions as a pressure stop, i.e., as pressure is applied to the diaphragm, which is deflected from the load, the boss eventually hits support 36 and is prevented from further movement. The stopping of the boss protects the structure from rupture caused by loads that exceed the tensile strength of the material. Support 36 may, for example, be constructed of glass or silicon.

Referring to FIG. 6, the force sensor 200 has a plate 40 which is bonded to the boss 28 and support 24. Force is applied to plate 40, providing a means for force reduction and, thus, a means for setting force range. The reduction factor depends on the thickness and the lateral dimension of the plate 40 and the diaphragm 26. Plate 40 is suitably made of glass.

Figure 7:
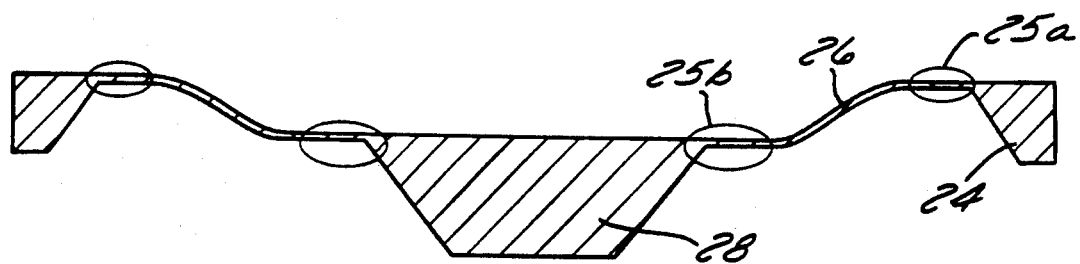
FIG. 7 is a schematic diagram illustrating the deformation shape of the diaphragm due to an applied mechanical load, all in accordance with the present invention.

FIG. 7 illustrates the shape of diaphragm 26 when deflected from a load. Because diaphragm 26 is supported by the boss 28 and substrate 24, displacement of boss 28 deforms diaphragm 26 into an "S-shape". The S-shaped configuration concentrates the bending stresses of diaphragm 26 in those regions 25a and 25b (ovals in FIG. 7), respectively. Region 25a of diaphragm 26 is proximate the substrate 24 while region 25b is proximate boss 28. For the loaded case illustrated in FIG. 7, in region 25a, the upper fibers of diaphragm 26 are in tension, while in region 25b, the upper fibers are in compression. The bending strains induced in the upper fibers of diaphragm 26 in regions 25a and 25b are, thus, of opposite signs.

The position of resonant beams 20 and 22 which are integral to diaphragm 26, corresponds to regions 25b and 25a, respectively. In the differential resonator configuration, the two resonators are subjected, respectively, to compressive and tensile forces. Thus, the two resonators, due to the S-shape deformation of diaphragm 26, are subjected to bending stresses or strains having opposite signs. This behavior causes the resonant frequency of resonator 22 to increase while at the same time the resonance frequency of resonator 20 decreases, resulting in a differential configuration.

The frequency of each resonator resulting from an applied pressure may be represented as:

$$f_1 = f_0 + \Delta f_1$$

$$f_2 = f_0 - \Delta f_2$$

where $f_1$ and $f_2$, respectively, are the frequencies of the two individual resonators when a load is applied, $f_0$ is the base or natural vibrational frequency of each resonator without an external load, and $\Delta f_1$ and $\Delta f_2$ are the shifts in frequency of the two individual resonators caused by the applied load. Mixing or subtracting the frequencies of the single resonators results in a signal frequency of $\Delta f$ equal to $\Delta f_1 + \Delta f_2$ which, to a first order approximation, is only a function of the applied mechanical load.

The output signal frequency, $\Delta f_1 + \Delta f_2$, effectively eliminates first order temperature effects and long term drift effects. Both these effects are primarily expressed in the base frequency $f_0$ which is not present in the signal frequency due to subtraction. The signal frequency, $\Delta f_1 + \Delta f_2$, experiences only small second order temperature and drift effects.

Moreover, as described above, the S-shaped deformation of diaphragm 26 concentrates the bending stresses in regions 25a and 25b. It is well known that concentrating stresses or strains in certain regions allows greater sensitivity in detection as opposed to having the stress or strain distributed over a great surface. In the sensor according to the present invention, resonators are positioned in regions of the diaphragm of concentrated stress. Thus, sensitivity for detection of frequency shifts due to diaphragm deformation is better than for frequency shifts from stresses distributed over a large surface. Feasible sensitivities for the sensor according to the present invention are about 100-400 Hz/Pa at a base frequency of 400-500 KHz. Such sensitivites are about two orders of magnitude higher than those reported in prior art devices.

Thermal mismatch between different materials used to construct a sensor can introduce stress. For example, sensors are often used with a support material as shown in FIG. 5. Thermal mismatch between the support material and the sensor material may introduce stress on the diaphragm. Thermal mismatch causes the diaphragm to bow, inducing stresses in the upper fibers of the diaphragm. These stresses are either tensile or compressive for all upper fibers in contrast to the condition depicted in FIG. 7. The thermally induced stress distorts both resonators. The sign of the frequency shift for each resonator due to this type of induced stress is the same. Thus, in obtaining the output signal frequency, i.e., subtracting $f_1$ from $f_2$, the thermally induced distortion is partially cancelled.

To achieve the required geometry of the sensor according to the present invention, various fabrication methods, such as alignment, patterning and masking techniques, well established in integrated circuit manufacturing technology, are used. The required structure is formed from a single piece of single-crystal silicon by a two-stage etching process, combining sacrificial and anisotropic etching. The diaphragm and cap are formed from layers of polysilicon stacked on the single-crystal silicon. Two methods of fabricating a structure on the semiconductor substrate in accordance with the present invention are schematically described.

Figure 8A:
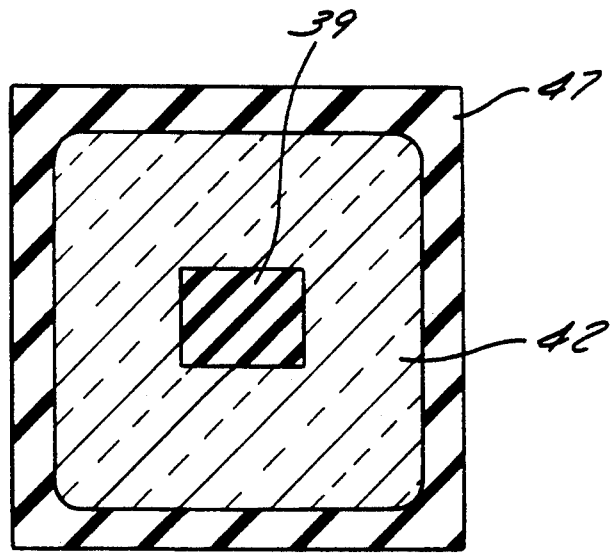
FIGS. 8(a)-8(n) are cross-section schematic diagrams of various stages of a first method of fabrication of a sensor.
Figure 8B:
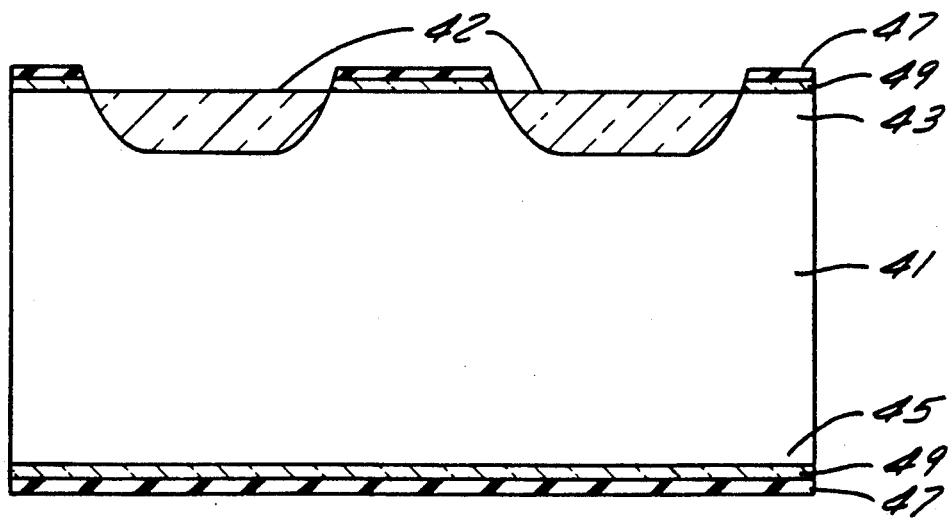
Figure 8C:
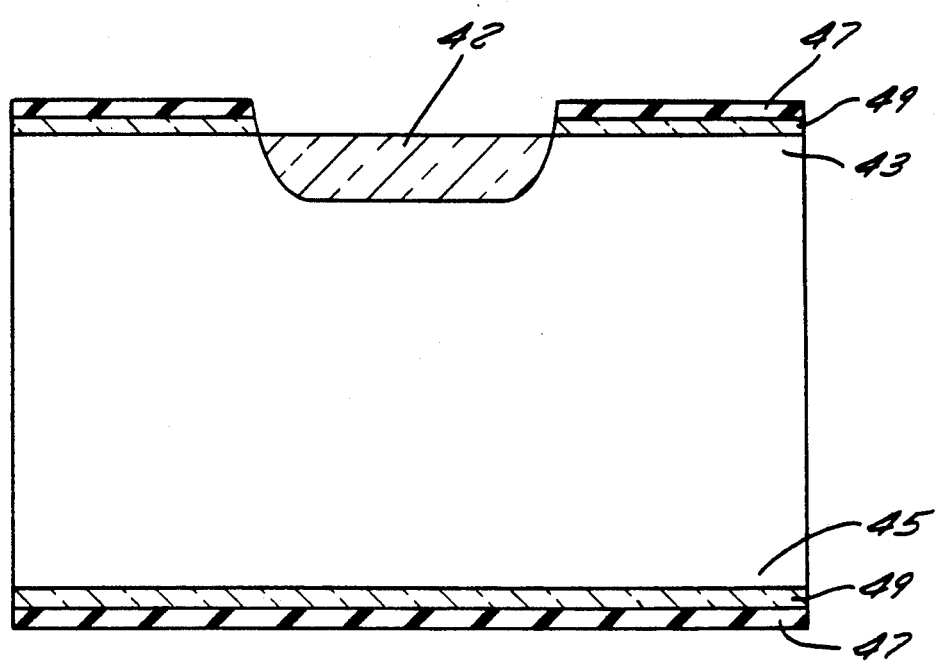
Figure 8D:
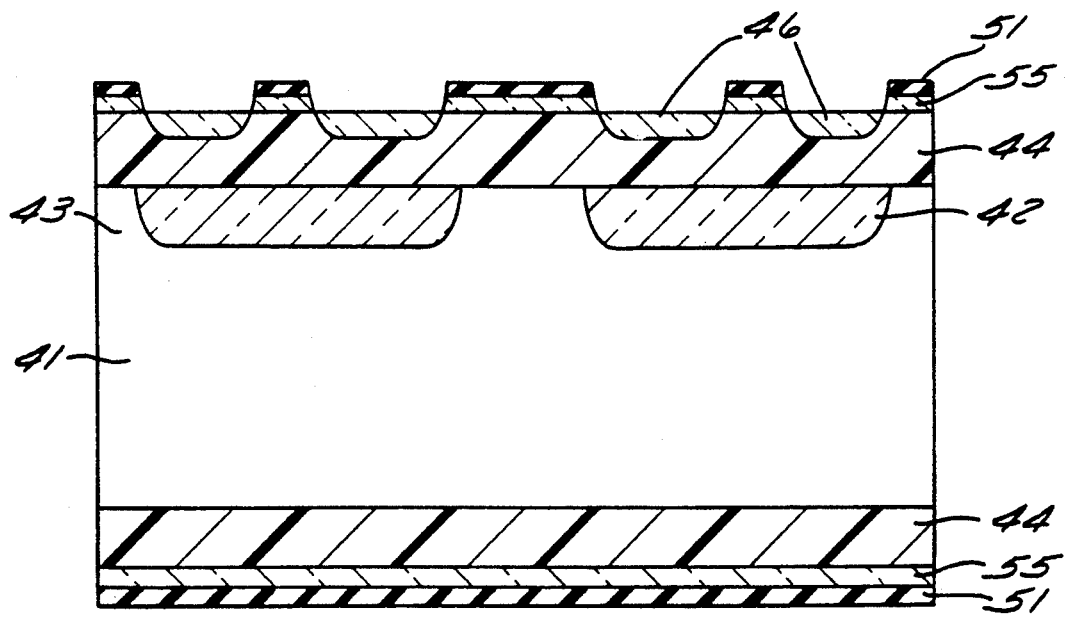
Figure 8E:
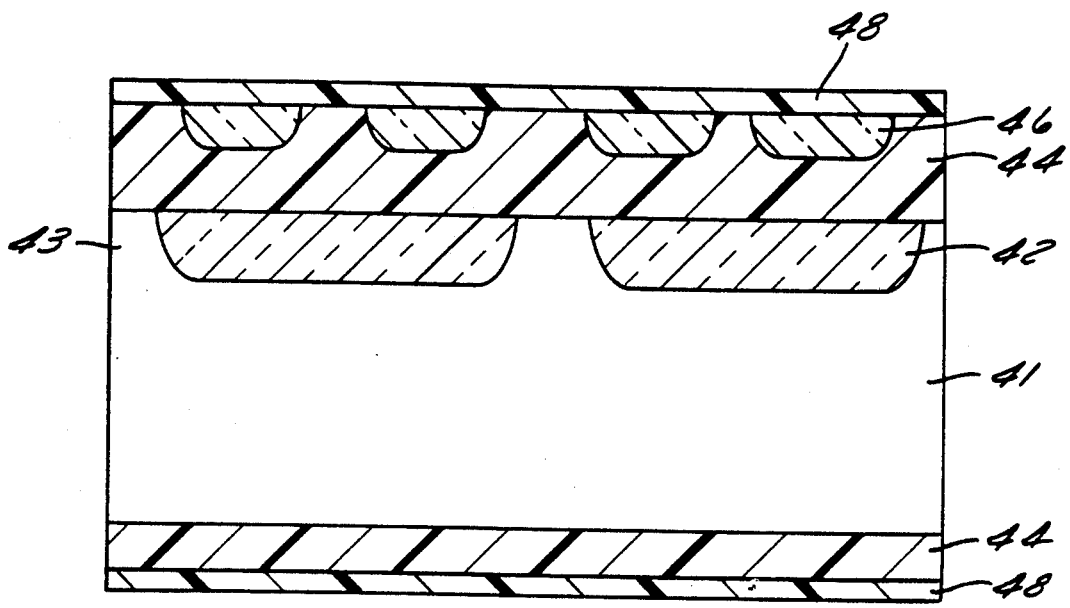
Figure 8F:
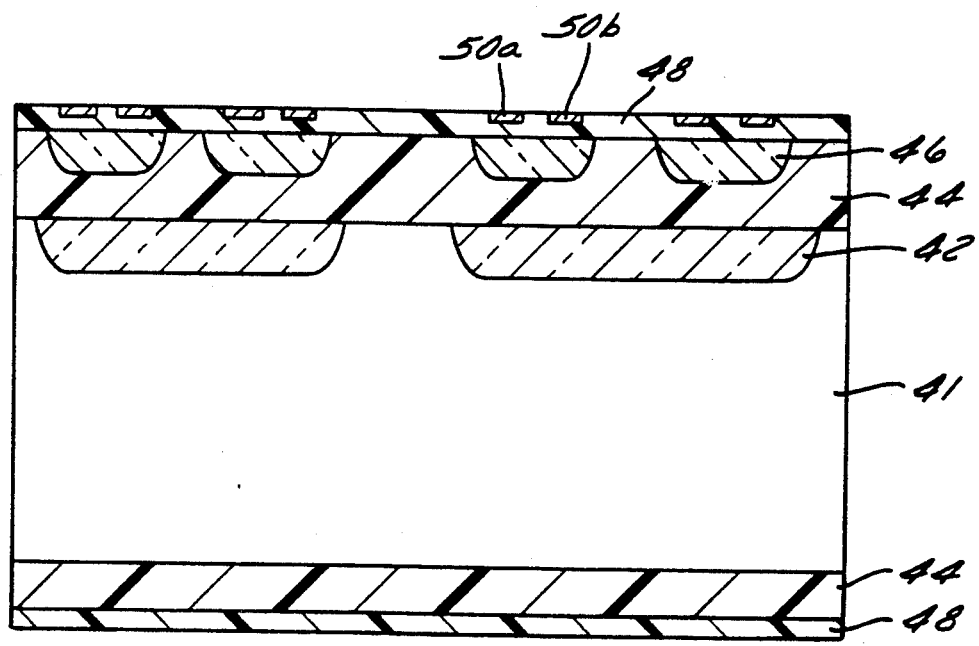
Figure 8G:
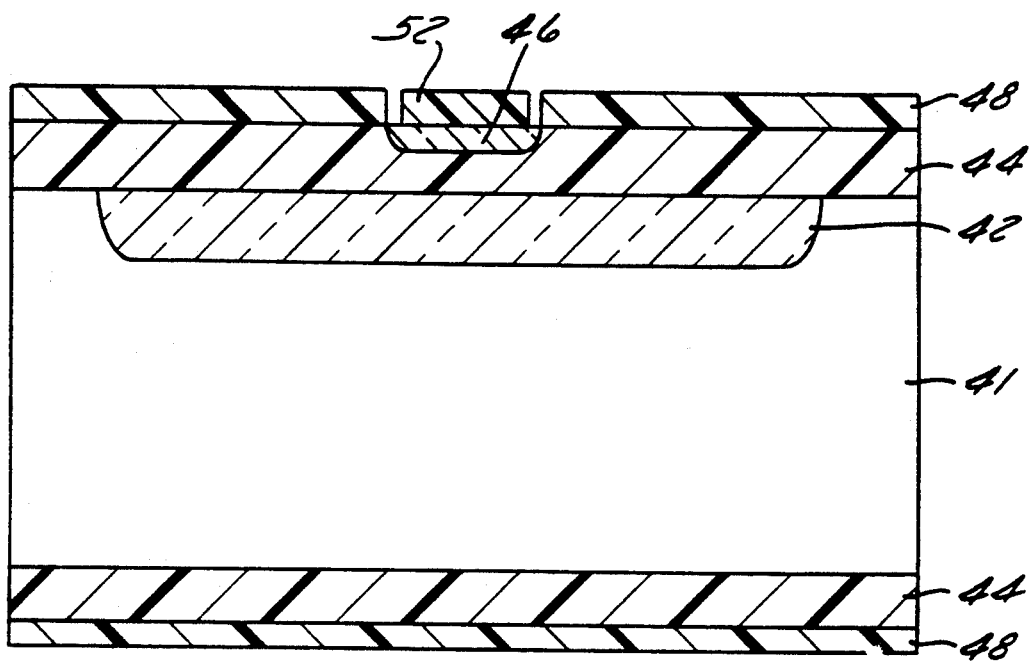
Figure 8H:
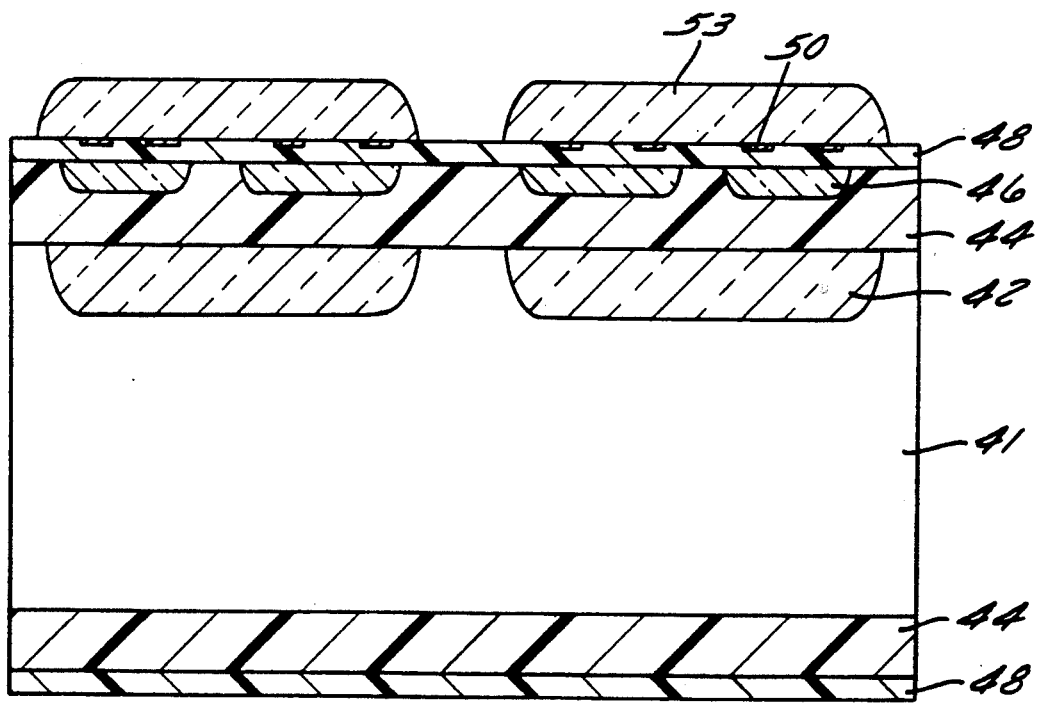
Figure 8I:
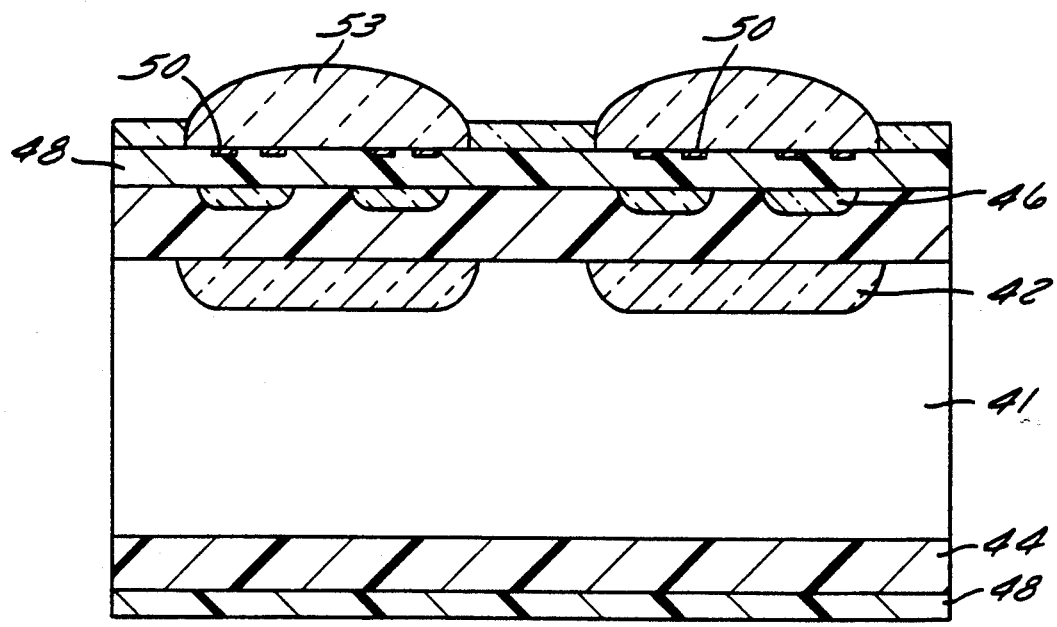
Figure 8J:
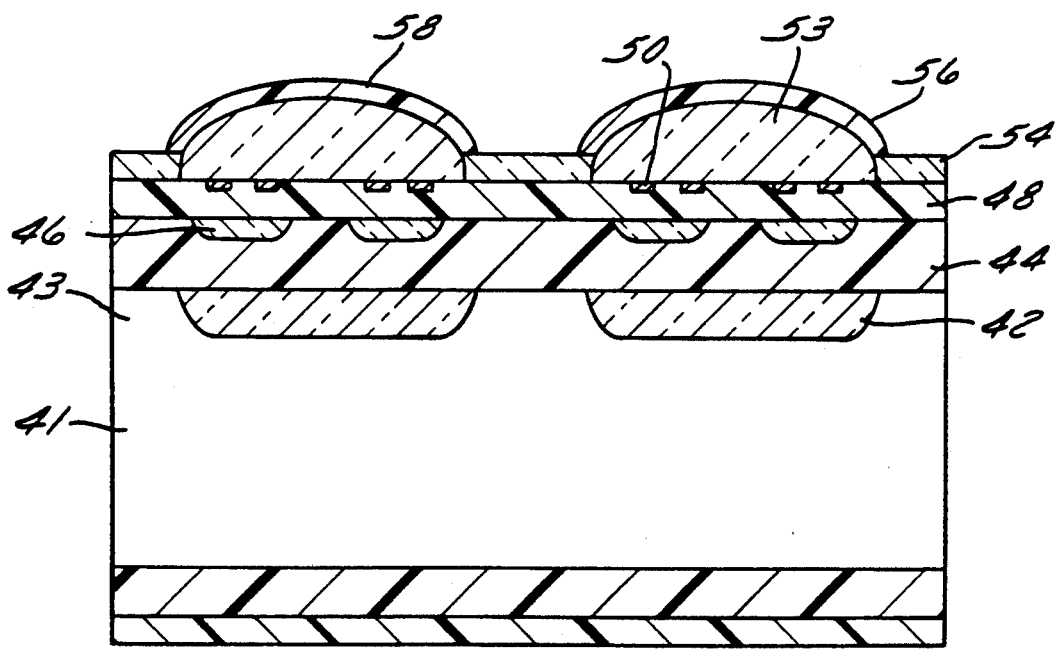
Figure 8K:
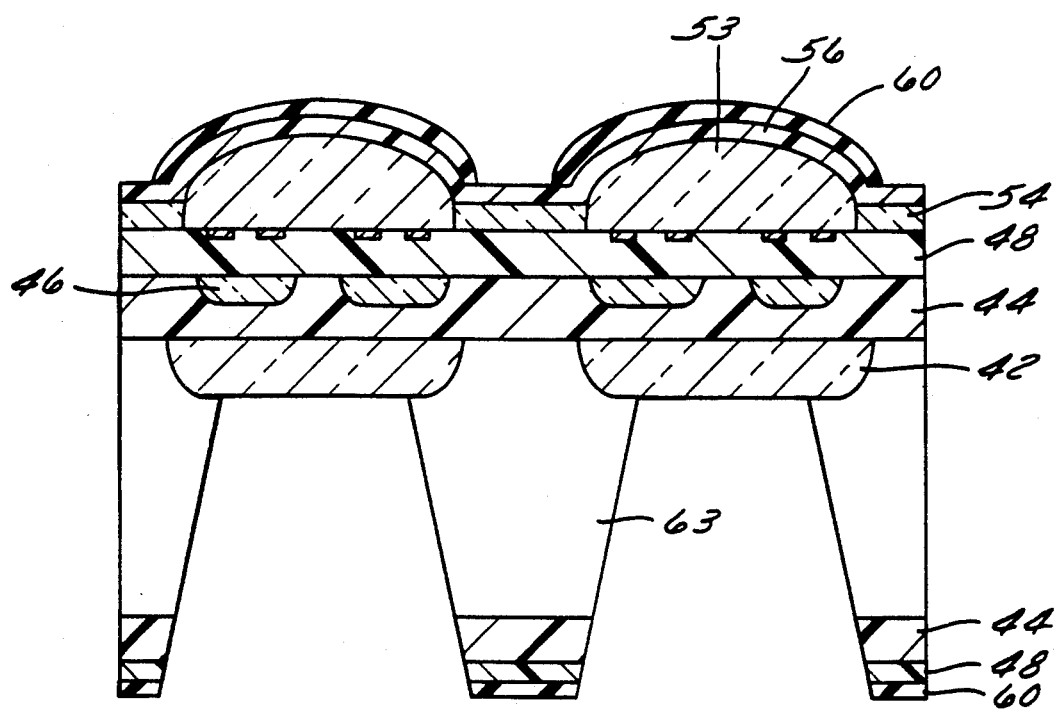
Figure 8L:
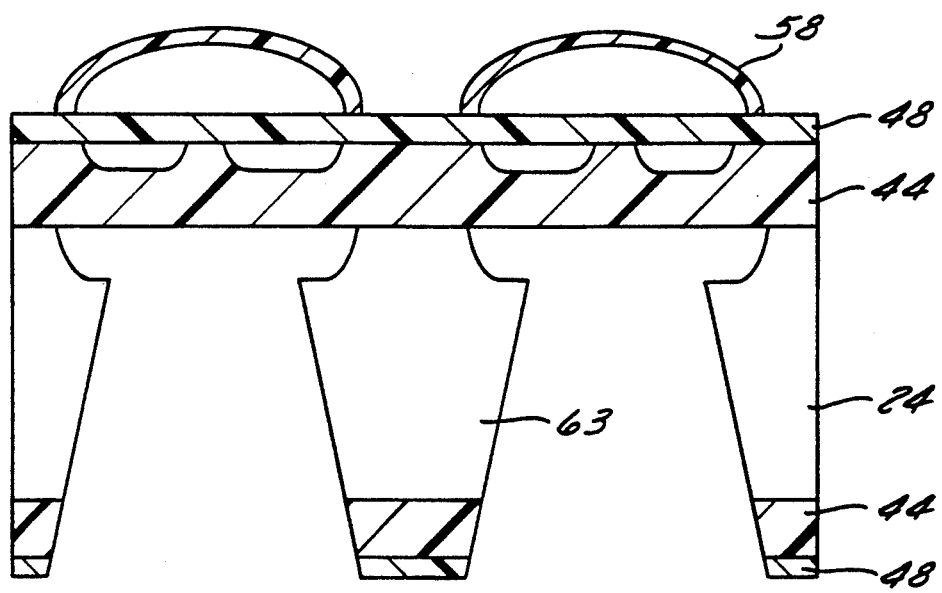
Figure 8M:
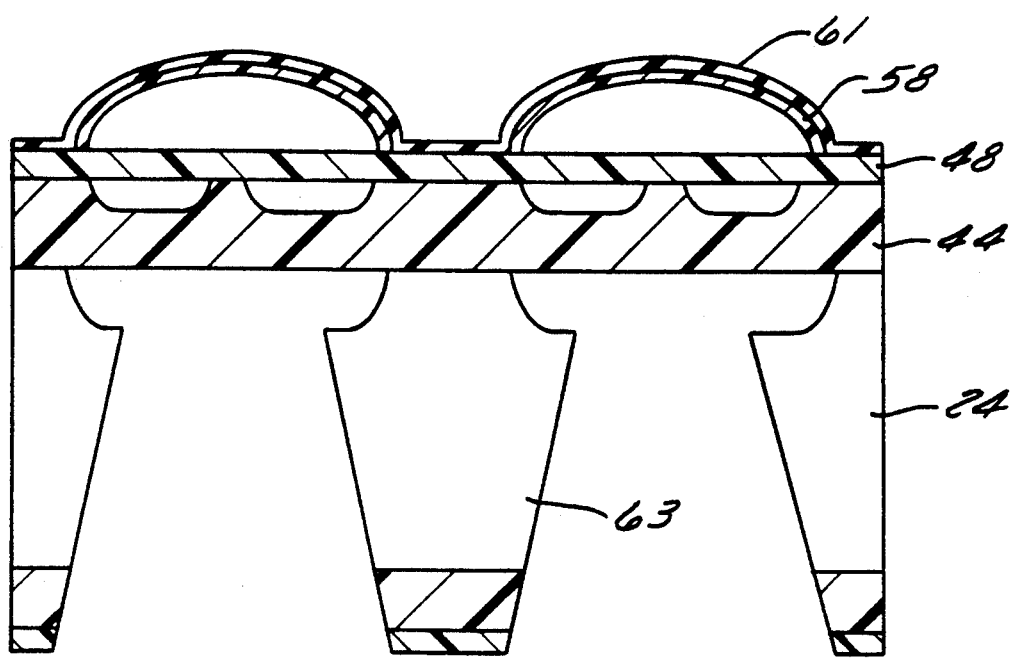
Figure 8N:
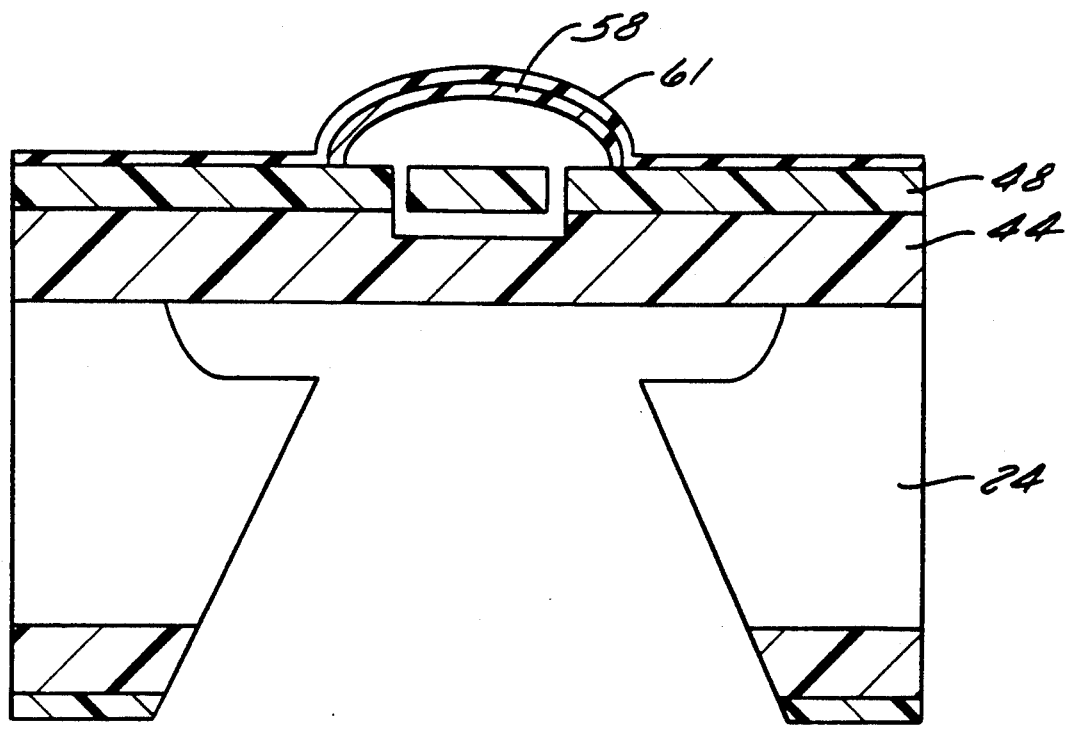

FIGS. 8(a)-8(n) schematically illustrate a first method of fabricating sensor 10 in which a thermally excited-piezoresistively detected resonator is formed in an evacuated cavity on a thin polysilicon diaphragm. FIGS. 8(a)-8(n) show the formation of two capped regions on a diaphragm and illustrate the formation of the boss. Referring now to FIGS. 8(a)-8(n), a silicon wafer is slightly oxidized to form a thin oxide layer 49. A layer of silicon nitride 47 is then deposited and patterned. The front side 43 of the silicon wafer 41 is then locally oxidized and planarized to form a first "tub-shaped" silicon dioxide (SiO$_2$) region 42. The starting material is a <100> oriented silicon wafer. Typically, a two-inch wafer has a thickness of about 300 μm. Larger wafers are generally thicker. The planar dimensions of oxide tub 42 will define the planar dimensions of the diaphragm to be formed. FIG. 8(a) illustrates a top view of the wafer 41 showing the tub region 42 and the regions of nitride layer 47 which are not oxidized. The center portion 39 of layer 47 will eventually become the top portion of the boss. FIG. 8(b) is a longitudinal section through wafer 41 and FIG. 8(c) is a lateral section.

The nitride layer 47 and oxide 49 are then stripped. The next step is to deposit a first polysilicon layer 44 on the front side 43 of the wafer 41. While such deposition steps are standard in integrated circuitry processing with a deposition temperature typically about 620° C., polysilicon depositions in the present method may be suitably performed at temperatures lower (590°-600° C.) than those typically used for integrated circuits fabrication. Another layer of nitride 51 and of oxide 55 are deposited and patterned. A second, smaller SiO$_2$ tub-shaped region 46 is then formed by local oxidation and planarization of the first polysilicon layer 44. The planar dimensions of oxide tub 46 will define the planar dimensions of the resonant beam to be formed. The nitride and oxide layers are then stripped.

Next, a second polysilicon layer 48 is deposited on the front side 43 of wafer 41. The thickness of this layer defines the thickness of the resonator. The next step is to implant p+-type resistors, such as boron, in regions 50a and 50b on layer 48. Layer 48 is then etched to define the resonant beam 52 as illustrated by the lateral cross-section of FIG. 8(g). The next step is to deposit and pattern glass 53, such as phosphorous silicate glass (PSG) or spin on glass (SOG), over the beam cut. A thin layer of oxide 54 is then grown over the surface of the wafer 41 and patterned to define anchors and channels for the cap to be formed. Next, a third polysilicon layer 56 is deposited and patterned over glass 53 to form cap 58 and the entire front side is covered with a silicon nitride layer 60.

In the next stage of the process, a back side etch of wafer 41 is then performed using an aqueous alkaline etchant, such as potassium hydroxide, or alternatively, a diamine aqueous solution such ethylene diamine, hydrazene diamine or propylene diamine with a catechol, for example, pyrocatechol and pyrazine. The backside etch is a typical anisotropic etch in which the etch rate in the <111> crystallographic direction is substantially slower than other directions, for example, the <100> direction. The etchant stops at the first SiO$_2$ region 42. Next, a sacrificial etch, using an etchant such as hydrogen fluoride or dilute hydrofluoric acid, removes layer 60, all SiO$_2$ and glass, and forms the substrate frame 24 and boss 63. Lastly, a sealant 61 such as polysilicon is grown. Contact holes are then cut in which a metal, such as aluminum, is deposited to form appropriate electrical contacts with the resistors. FIG. 8(n) is a lateral section illustrating the finished sensor.

Compared to those methods previously decribed in the prior art, certain differences may be noted in the present method. The lateral dimensions of the diaphragm (and the boss) are determined at the front side of the silicon wafer using a local oxidation process. The dimensions of the diaphragm are not dependent on the thickness of the wafer or on the anisotropy of the backside etch. Dependency of lateral dimensions on wafer thickness is a known disadvantage in prior fabrication methods. Because the diaphragm has a laminar structure of thin film layers, the thickness of the diaphragm (and the beam) may be precisely determined. Since the shape of the diaphragm is independent of the backside etch, the limitations imposed by anisotropic etching, i.e., orthogonal structures, are removed. A circular diaphragm is as easy to make as a square one.

Additionally, the front to back aligning in the present method is less critical than in prior methods. Generally, aligning within 50 μm is sufficient.

Fabrication of the sensor structure described hereinabove requires modification to utilize piezoelectric excitation and detection of the vibration using thin films of piezoelectric materials such as zinc oxide or aluminum nitride. Zinc oxide (ZnO) is very attractive as an excitation/detection material because it has a high piezoelectric coefficient ($d_{31}$) and because it can be deposited as a thin film. The ZnO elements, however, must be protected during the sacrificial layer etch of the glass and $SiO_2$ layers. ZnO also is not very compatible with integrated circuit materials. The ZnO elements must also be completely encapsulated to prevent impurities, e.g., Zn of the ZnO layer, from diffusing into the polysilicon layers.

Figure 9A:
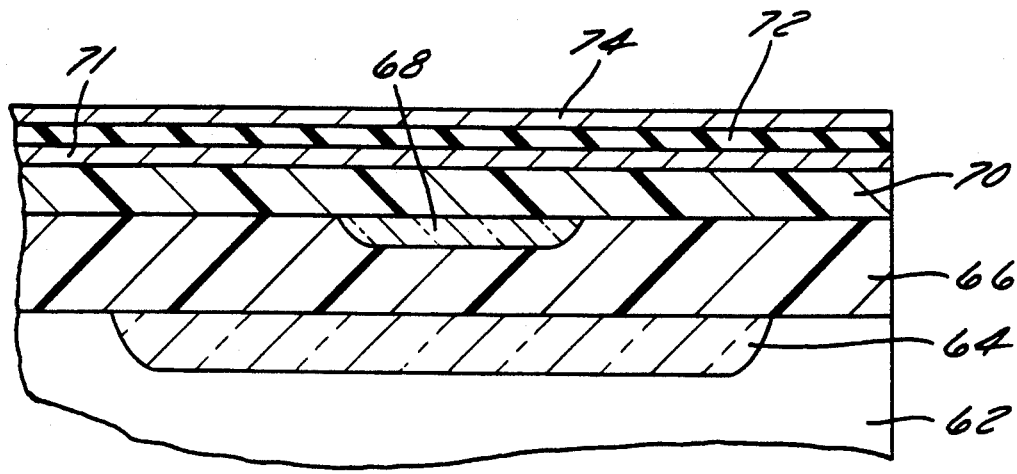
FIGS. 9(a)-9(d) are cross-section schematic diagrams of various stages of a second method of fabrication of a sensor using zinc oxide elements.
Figure 9B:
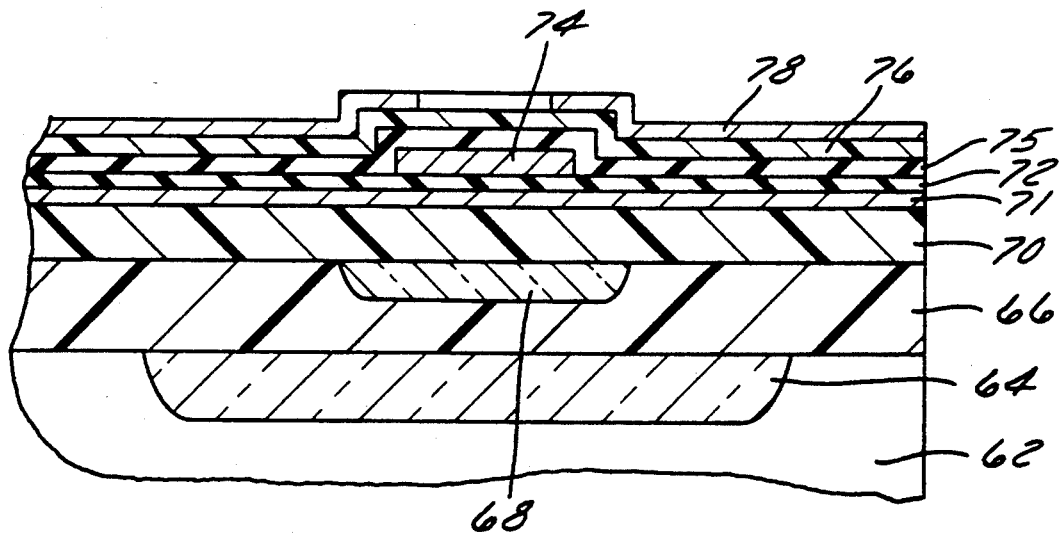
Figure 9C:
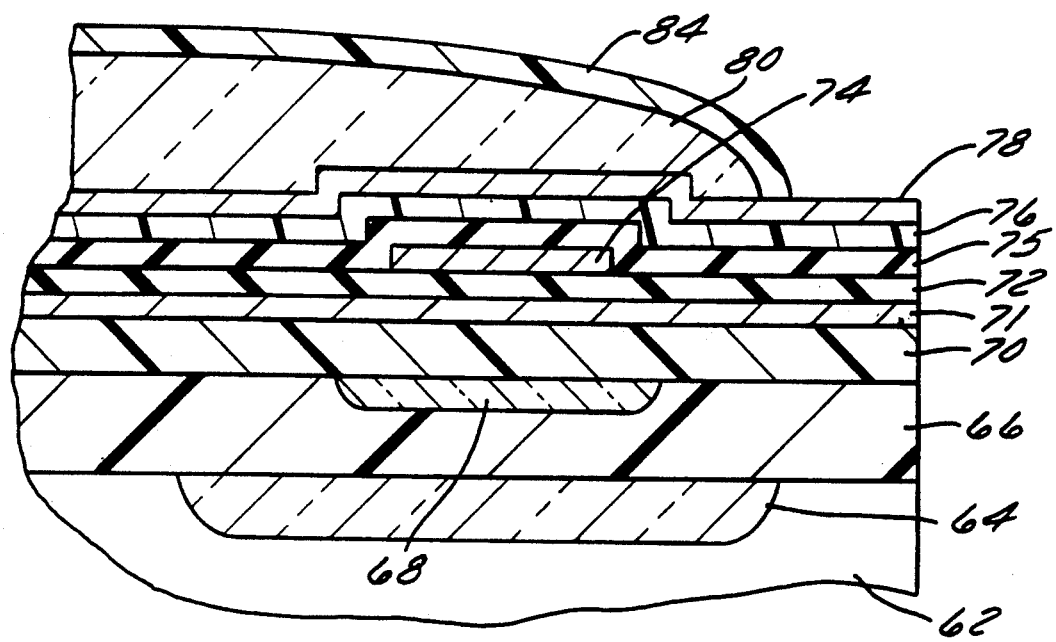
Figure 9D:
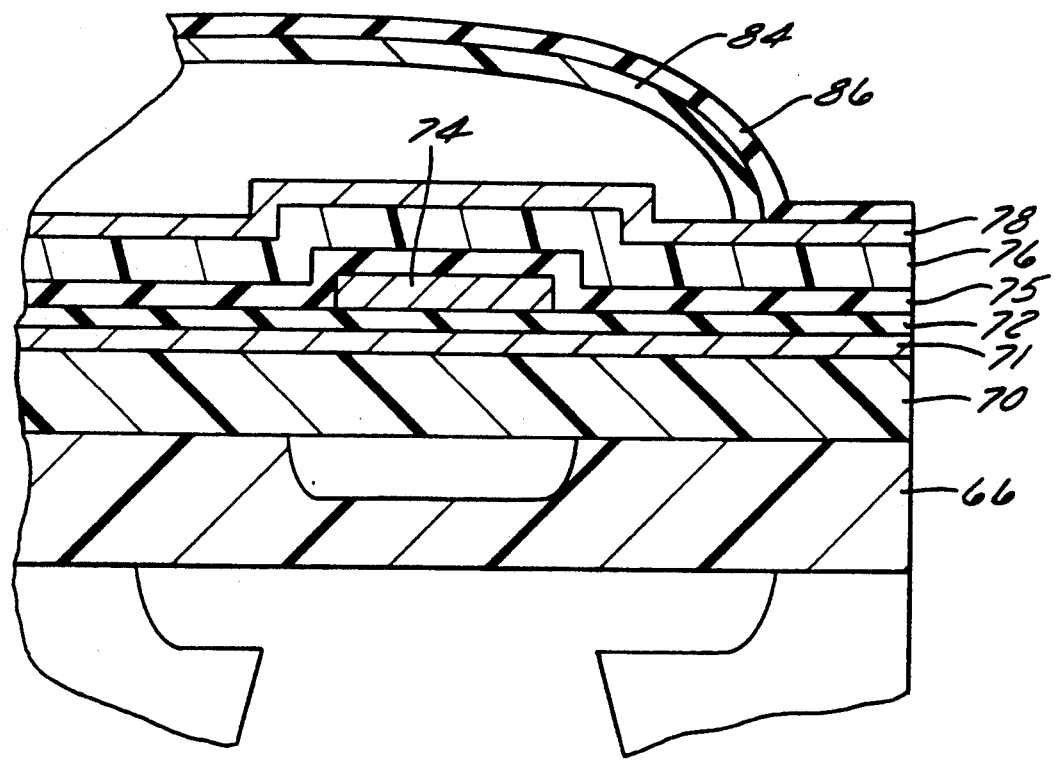

FIGS. 9(a)-9(d) schematically illustrate a second method of fabricating a sensor in which piezoelectric ZnO films are used as exciters and detectors. These figures illustrate the fabrication of one beam of a pair of beams to be housed upon a single cap. Referring now to FIG. 9(a)-9(d), the first steps of fabrication are the same as those described above in FIG. 8(a)-8(e). As illustrated in FIG. 9(a), a silicon wafer 62 is locally oxidized and planarized to form a first $SiO_2$ tub-shaped region 64. A first polysilicon layer 66 is deposited and locally oxidized to form a second oxide tub region 68, followed by deposition of a second polysilicon layer 70. Next, conductor 71, for example, boron, is implanted on the second polysilicon layer 70 to form a bottom electrode. An insulator layer 72, such as silicon nitride, is then deposited. Next, a layer 74 of ZnO is deposited. The ZnO layer 74 is then patterned. Another insulating layer of silicon nitride 75 is deposited. A third layer of polysilicon 76 is deposited and a conductor 78 is implanted to form a top electrode. The third polysilicon layer 76, second layer 70, and the insulating silicon nitride layers are etched to define the beam. A layer 80 of PSG or SOG is deposited over the beam cut. A thin layer 82 of $SiO_2$ is deposited to form anchors and for etch channels for the cap to be formed. A fourth polysilicon layer 84 is deposited and patterned to form the cap. Then, a back side etch of the wafer is performed. A sacrificial etch removes all silicon nitride, $SiO_2$ and PSG or SOG. A sealant 86 is applied to form the evacuated cavity.

Figure 10:
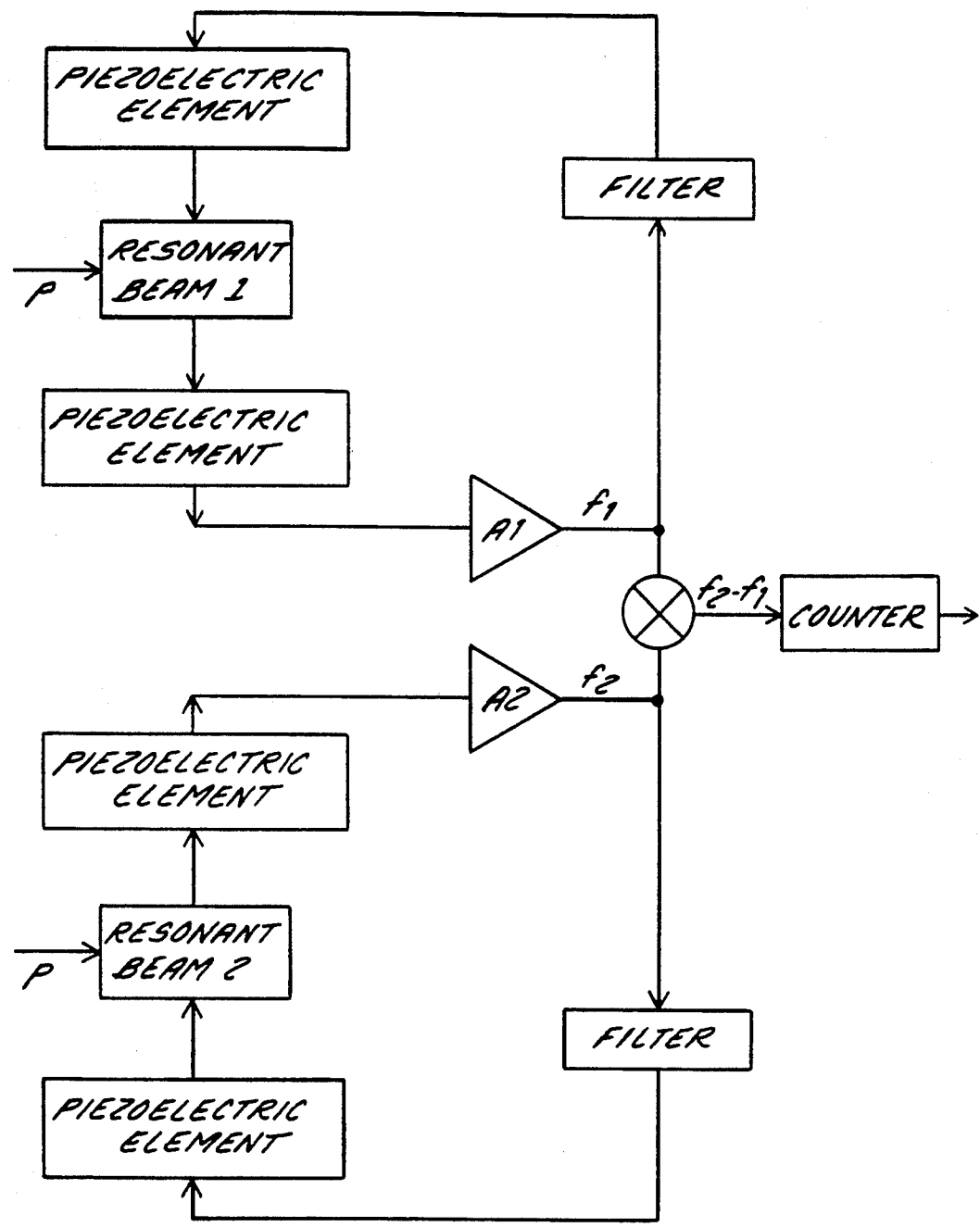
FIG. 10 is a schematic diagram illustrating the circuitry of the differential configuration sensor using analog circuitry to provide the frequency difference.
Figure 11:
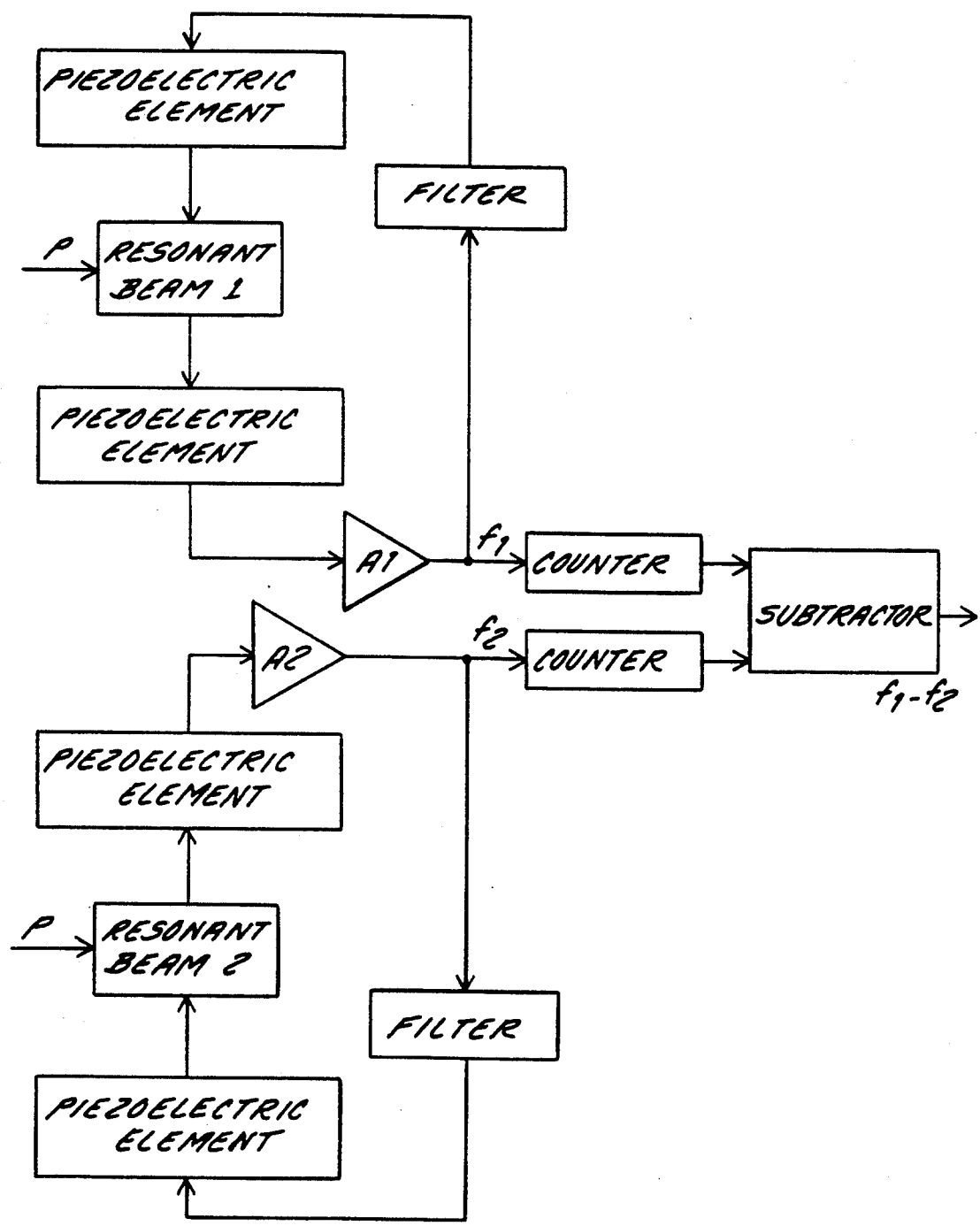
FIG. 11 is a schematic diagram illustrating the circuitry of the differential configuration sensor using digital circuitry for substrating the frequencies.

FIGS. 10 and 11 illustrate suitable circuit diagrams using piezoelectric ZnO elements. The circuit includes an oscillator and a frequency filter. The frequency of the oscillator is the same as the resonant frequency of the resonator, i.e., the beam. For the differential resonator configuration either an analog frequency mixer or a digital substractor may be used to obtain the difference frequency. Blocks A1 and A2 in FIGS. 10 and 11 include circuitry components such as impedance matching networks for the resonators, a phase shifter, and an amplifying circuit (not shown).

Modifications of the present invention may be suggested to or made by those of ordinary skill in the art without departing from the scope of the invention as expressed in the appended claims.

I claim:

1. A resonant mechanical sensor, comprising:
   a diaphragm substantially supported along the outer periphery thereof by a substrate, a boss member abutting a region of said diaphragm remote from said outer periphery, at least one resonator having one end integral with said diaphragm proximate to said region and another end integral with said diaphragm remote from said region, and means for detecting a change in the natural frequency of said resonator due to an applied load.

2. The sensor of claim 1, wherein said resonator is a beam clamped at both ends.

3. The sensor of claim 1, wherein said diaphragm has a substantially laminar construction comprising thin film layers.

4. A resonant mechanical sensor for detecting an applied load, comprising:
   a substrate;
   a diaphragm substantially supported along the outer periphery thereof by said substrate;
   a boss member abutting a region of said diaphragm remote from said outer periphery;
   at least one resonator having one end integral with said diaphragm proximate to said region and another end integral with said diaphragm remote from said region;
   means for hermetically sealing and enclosing said resonator; and
   means for detecting a change in the natural frequency of said resonator due to an applied load.

5. The sensor of claim 3, wherein said sensor has two resonators in the form of beams, one of said beams having an end integral with said diaphragm proximate said region and the other of said beams having an end integral with said diaphragm proximate the outer periphery of said diaphragm.

6. The sensor of claim 3, wherein said means for detecting a change in the natural frequency comprises a piezoelectric material sandwiched between two electrodes.

7. The sensor of claim 6, wherein said piezoelectric material is zinc oxide.

8. A resonant mechanical sensor for detecting an applied mechanical load, comprising:
   a substrate;
   a diaphragm substantially supported along the outer periphery thereof by said substrate;
   a boss member abutting a region of said diaphragm remote from said outer periphery;
   at least one resonator in the form of a beam having one end integral with said diaphragm proximate to said region and another end integral with said diaphragm remote from said region;
   a first electrode disposed on said beam;
   a piezoelectric layer encapsulated by an insulator disposed on said first electrode;
   a second electrode disposed on said piezoelectric layer; and
   a hermetic cap enclosing said beam.

9. The sensor of claim 8, wherein said sensor has two resonators in the form of beams, one of said beams having an end integral with said diaphragm proximate said region and the other of said beams having an end integral with said diaphragm proximate the outer periphery of said diaphragm.

10. A method for fabricating a resonant mechanical sensor, comprising the steps of:
   forming a diaphragm substantially supported along its outer periphery by a substrate;
   providing a boss abutting a region of said diaphragm substantially remote from said outer periphery; and
   forming a resonator having one end integral to said diaphragm proximate to said region and another end integral to said diaphragm remote from said region.

11. The method of claim 10, wherein said step of forming a diaphragm includes providing successive layers of thin film on a first surface of said substrate.

12. The method of claim 10, wherein said step of forming a resonator includes sacrificial layer etching of said diaphragm.

13. The method of claim 10, further comprising the step of hermetically sealing and enclosing said resonator in a cap.

14. The method of claim 10, further comprising the step of providing means for detecting a change in the natural frequency of said resonator due to an applied load.

15. The method of claim 14, wherein said providing step comprises sandwiching a piezoelectric layer between two electrodes.

* * * * *